Figures 1, 2:
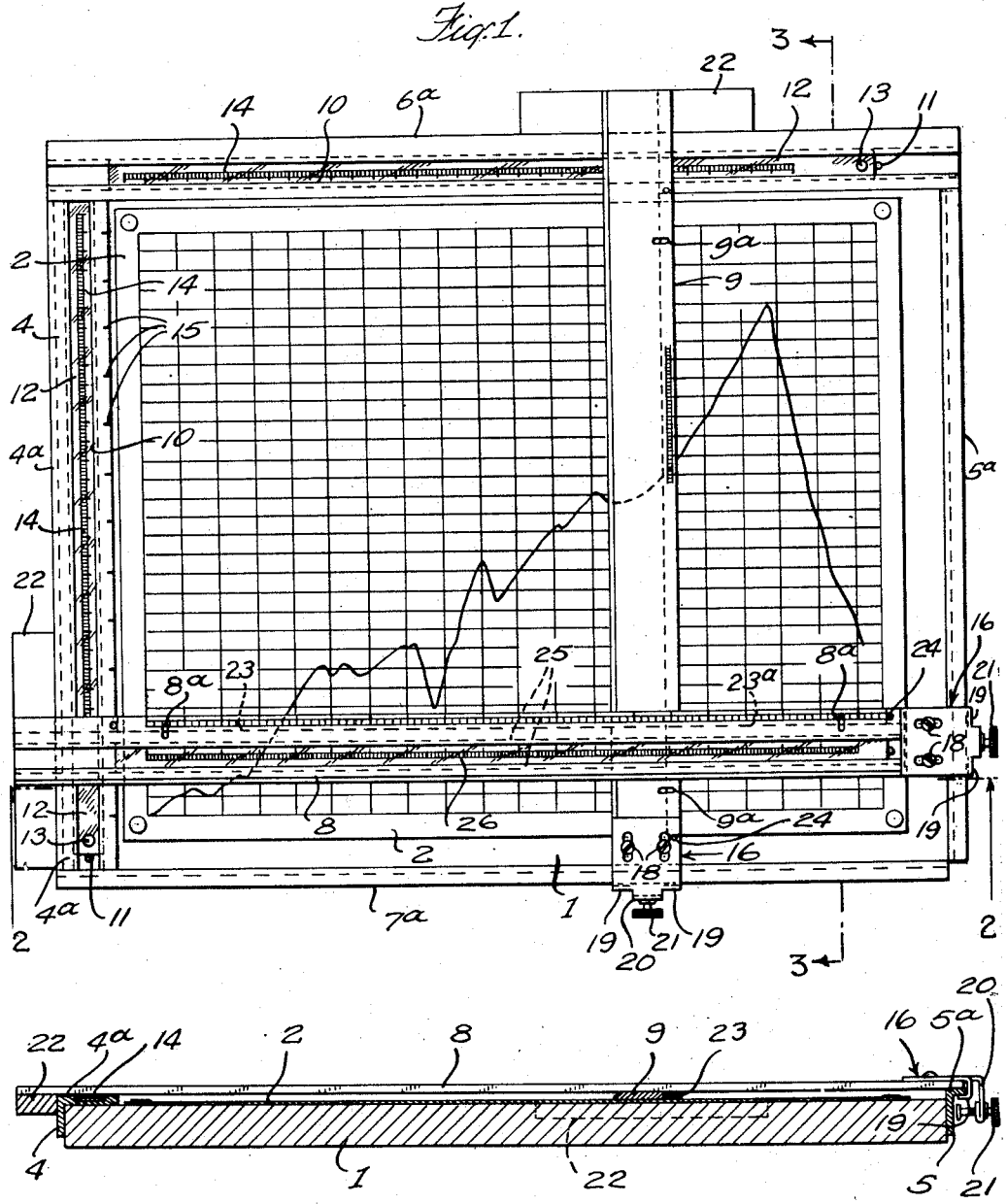

July 6, 1954  C. H. WATSON  2,682,709
PLOTTING DEVICE

Filed Aug. 20, 1948  4 Sheets-Sheet 1

INVENTOR
CLEMENT H. WATSON
BY
Blair, Curtis + Hayward
ATTORNEYS

July 6, 1954 C. H. WATSON 2,682,709
PLOTTING DEVICE
Filed Aug. 20, 1948 4 Sheets-Sheet 2
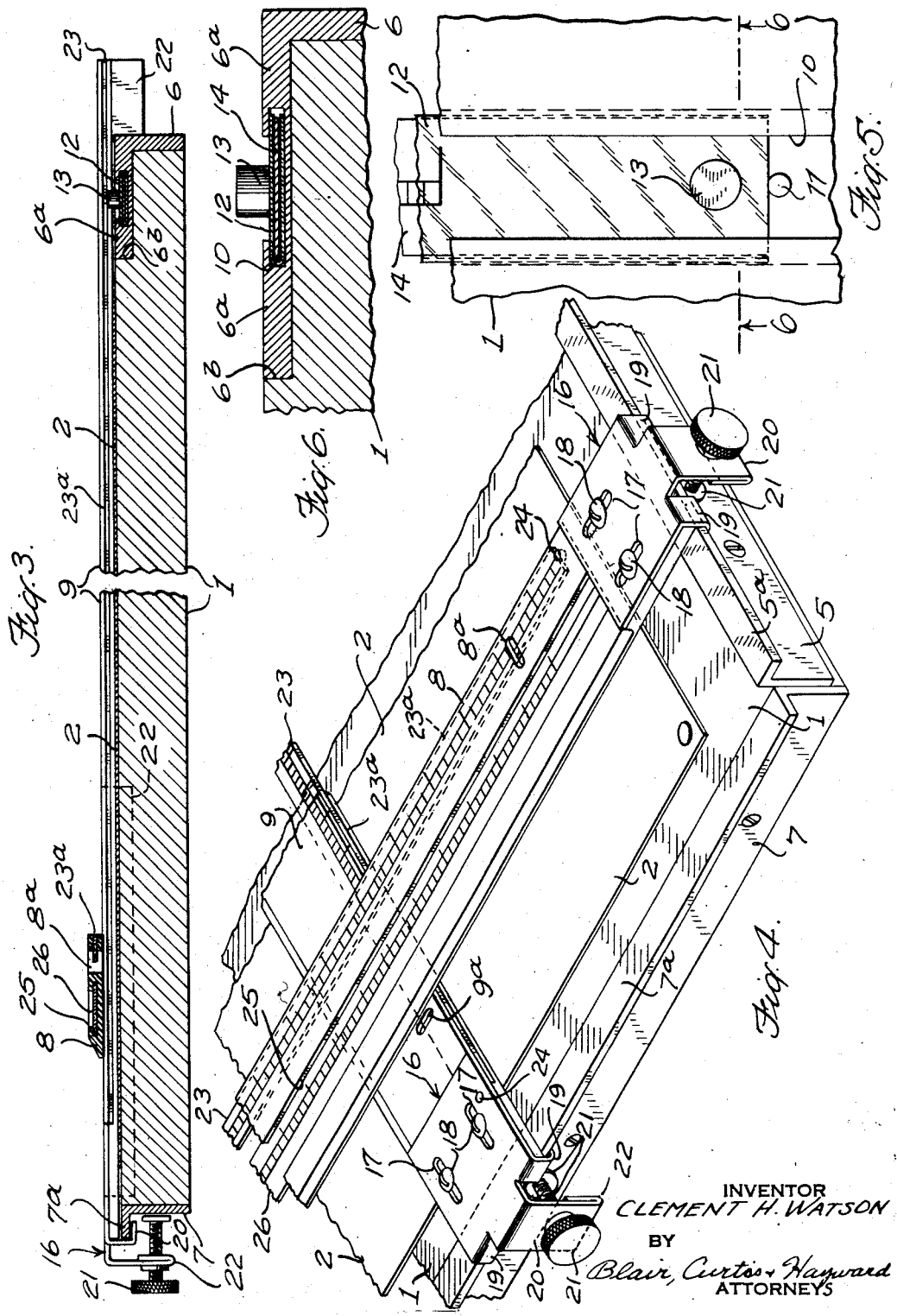
INVENTOR
CLEMENT H. WATSON
BY
Blair, Curtis & Hayward
ATTORNEYS July 6, 1954

C. H. WATSON 2,682,709

PLOTTING DEVICE

Filed Aug. 20, 1948

4 Sheets-Sheet 3

INVENTOR
CLEMENT H. WATSON.
BY
Blair, Curtis & Hayward
ATTORNEYS

July 6, 1954
C. H. WATSON
2,682,709
PLOTTING DEVICE
Filed Aug. 20, 1948
4 Sheets-Sheet 4
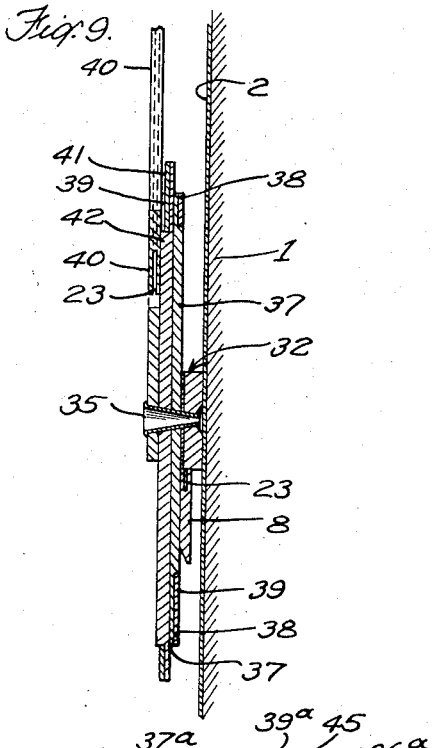
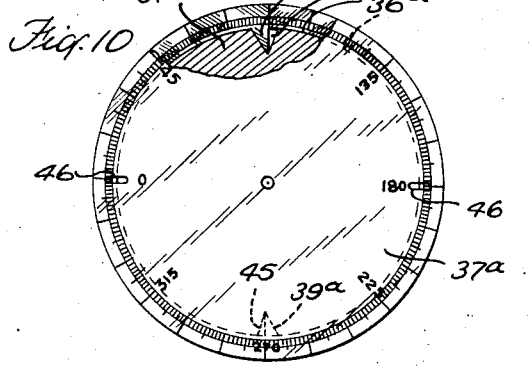
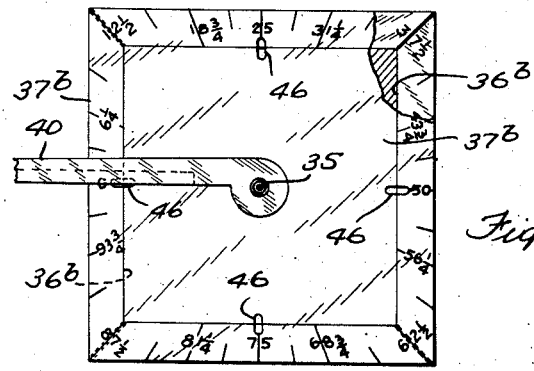
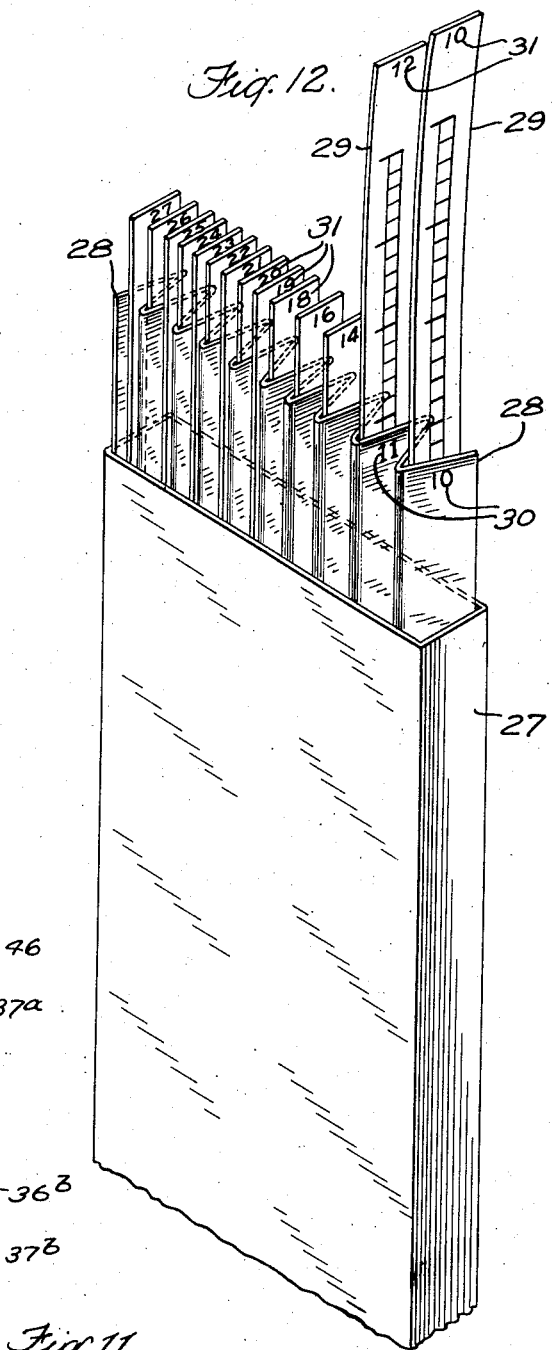
INVENTOR
CLEMENT H. WATSON
BY
Blair, Curtis + Hayward
ATTORNEYS

Patented July 6, 1954

2,682,709

UNITED STATES PATENT OFFICE 2,682,709

PLOTTING DEVICE

Clement H. Watson, New York, N. Y.

Application August 20, 1948, Serial No. 45,221

1 Claim. (Cl. 33—80)

The present invention relates to plotting devices.

One object of the present invention is to provide a device for plotting data in graphic charts or the like. More particularly it is an object to facilitate such plotting by elimination of calculations and transposing of data to existing scales. It is an object to make the plotting of such data so direct and simple as to avoid errors which heretofore have tended to creep into such plotting operations and to give full flexibility, i. e., latitude to anyone plotting a chart to select whatever scale or scales, whatever areas, whatever indexing lines and whatever units may best serve his immediate purpose.

It is an object to provide for the simultaneous use of two or more scales in plotting comparative data on the same chart. It is a very important object to speed the plotting of data by elimination of time consuming steps which have heretofore been necessary, and also to provide for very quick "roughing out" of a chart to test the most effective presentation.

Another object of the invention is to free the chart maker from plotting paper; to give charts which have no extraneous plotting-paper lines to confuse or obscure the presentation of the data; to make possible the direct construction of charts on other papers, e. g. in areas between typed text where it will bring the graphic illustration immediately beside the text to which it relates; to permit the use of any desired area with any desired borders; to avoid the necessity for stocking many different plotting papers or specially purchasing such paper for each chart and to save the time required for selecting and obtaining a suitable paper and for adapting a scale to its fixed lines.

Another object of the invention is to provide for making cumulative charts without need for calculations and with minimum time required to measure off the cumulative values.

Another object is to provide interchangeable scales and to so provide for their protection in use and between uses that their markings remain clear and exact notwithstanding long continued use. Another object is to facilitate plotting of polar graphs and "pie charts."

With these and other objects in view, as will be made more apparent from the following discussion and description of the invention, my invention contemplates a drawing board, or the like, equipped with at least one sliding scale and advantageously with rectangularly crossed T squares having provisions for receiving interchangeable scales. These crossed T squares are freely slidable transversely over the base or supporting surface which carries the paper or other material upon which the chart is being plotted; and the T squares may advantageously be provided with devices for releasably securing them in various positions of adjustment in relation to the board and to each other.

The interchangeable scales, each having different markings, may be conveniently carried according to my invention in predetermined order in a case which fully protects them and from which they are readily removable for use.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

Figure 7:
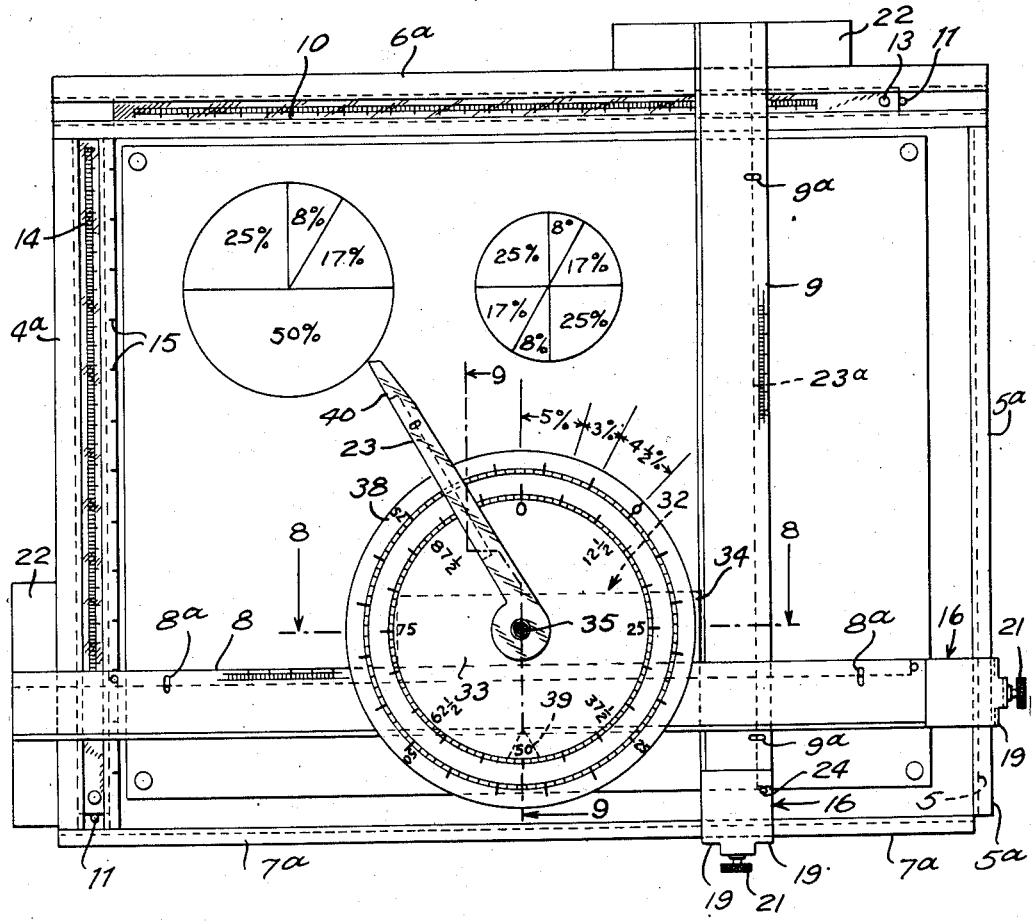
Figure 8:
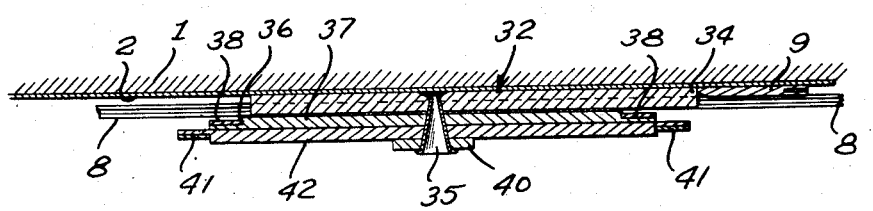

In the drawings:

Figure 1 is a plan view;

Figure 2, a transverse section on the line 2—2 of Figure 1;

Figure 3, a vertical section on the line 3—3 of Figure 1;

Figure 4, a fragmentary isometric view on enlarged scale illustrating a corner portion of the apparatus shown in Figure 1;

Figure 5, a fragmentary top plan view on enlarged scale of an end portion of one side of the base member, illustrating details of construction of one form of sliding scale carrier arranged adjacent one edge of the base;

Figure 6, a transverse section on the line 6—6 of Figure 5;

Figure 7, a plan view illustrating an angular scale employed in combination with one or more linear scales and with the T squares shown in Figure 1;

Figure 8, a horizontal section on the line 8—8 of Figure 7;

Figure 9, a section on the line 9—9 of Figure 7 with thicknesses exaggerated for clarity of showing;

Figure 10, a plan view illustrating another form of dial, or angular scale carrier and a scale having different markings from 0-360 instead of from 0-100, said scale being interchangeable with others having markings indicating different angular divisions, all being insertable and removable in relation to the adjustable angular scale carrier shown in Figure 7;

Figure 11 shows still another form of scale carrier and scale; and

Figure 12, a view in perspective of a quiver provided with scale receiving pockets adapted to hold different linear scales in segregated relation and with identifying indicia on the scales corresponding with similar indicia on various portions of the pocket.

Referring to the drawings, apparatus according to the invention comprises a base 1 having a flat top surface adapted to receive and support a sheet of drawing paper 2, or the like, temporarily secured thereto in a conventional manner.

As seen in Figure 2, the base 1 is provided at two of its opposite edges with angle metal straight edges 4 and 5, respectively. Angle 4 is secured to base 1 with one flange thereof engaging one edge surface of said base and with the other flange 4a extending inwardly therefrom and overlying a top portion of base 1. The other angle 5 is secured along the opposite edge surface of base 1 with one flange engaging the opposite edge surface of said base, and the other flange 5a extending outwardly therefrom and with its top surface disposed above the level of the top surface of the base and in the plane of the top surface of the horizontally disposed flange 4a of angle 4.

Referring now to Figure 3, the base 1 is provided at its other two opposite edges with angle metal straight edges 6 and 7, respectively. Angle 6 is secured to the outer surface of one of said edges and its horizontal flange 6a lies in a recess 5b formed along said edge of base 1. The upper surface of flange 6a is flush with the top surface of base 1. Angle 7 is secured to base 1 with its vertical flange lying against the lateral edge surface thereof and with its horizontal flange 7a extending outwardly from base 1. The top surface of flange 7a is flush with the top or sheet supporting surface of base 1 and in the plane of the upper surface of flange 6a.

T squares 8 and 9, respectively, are supported in slidably adjustable relation to each other and to the top surface of base 1. Thus, the horizontally disposed T square 8 is arranged with its blade portion above and spaced from said top surface, and with one end portion of said blade riding on the top surface of flange 4a, Figure 2, and with an opposite end portion of said blade riding on the top surface of flange 5a. The vertically arranged T square 9 is mounted with one end of its blade portion engaging the top surface of flange 7a and the opposite end portion engaging the top surface of flange 6a. With the T squares arranged as described, the blade of T square 9 lies between the blade of T square 8 and the top surface of base 1. Obviously the inverted arrangement with flanges 6a and 7a and the blade 9 raised above the base 1 and the blade 8, respectively, may be used.

As indicated in Figures 2, 3, 5 and 6, each of the flanges 4a and 6a is provided with a longitudinally extending angular edge, which with the opposed angular edge of the strip 10 spaced therefrom forms an undercut slot conveniently open at both ends. A stop pin 11 arranged adjacent an end portion of each said slots serves to limit the extent of movement of a scale carrying slide 12, Figure 6, preferably formed of flexible sheet material such as a transparent plastic, or the like. For convenience in operation and mounting, said slide 12 is provided with a fingerpiece 13, which stands above the level of the flange sufficiently to be engaged by the edge of the T square which slides over it; and the scale on slide 12 has its zero point spaced from the piece 13 a distance equal to the width of the T square, so that when the T square is moved along the flange 4a or 6a it pushes the piece 13, and thru it slide 12, with it and the scale will always read from the edge of the T square.

With the construction just described, a linear scale 14, being one of a plurality of interchangeable but differently marked scales, is assembled with a portion engaged by slide 12. Said slide is then introduced into the undercut between 4a and 10 at one end thereof and, by means of fingerpiece 13, is moved toward the opposite end to any desired position of adjustment, e. g., initially into engagement with stop pin 11. Obviously, scale 14 may be moved against the pin 11 and thereafter used as a fixed scale, or it may be moved to cumulate values as described below. The stop 11 is not essential, but is advantageous as a quick means of resetting the sliding scale to a definite zero position. The fingerpiece 13 is advantageously higher than the level of the face of the flange 4a or 6a so that it abuts the edge of the T square 8 or 9 and is so positioned that when it abuts the T square one edge thereof is at zero position on the scale 14.

As shown in Figure 1, an inner edge portion of the top surface of flange 4a is provided with scale markings 15, but ordinarily these are not required and may be omitted. If desired, the same or similar scales may be provided in or adjacent to flange 6a. By thus providing a plurality of parallel scales, 12, 15 and/or 23, the apparatus is well adapted for simultaneously plotting several sets of data on different scales on the same chart. If desired additional scales may be provided similar to scales 12, 15 or 23 and similarly mounted, if more than three different scales are to be used on the same chart. This is illustrated in Figure 4, and more particularly described below.

Considering now the T squares 8 and 9, means are provided whereby each may be moved rectilinearly in relation to the other and to the base 1, and whereby each may be releasably locked or secured in any desired position of adjustment. For the latter purpose, the T square 8, for example, Figure 4, is provided at one end with a fitting 16 having slots 17 through which extend screws 18 by means of which the blade of T square 8 is adjustably secured to said fitting 16. The latter is also provided with hooks 19 which engage the edge and under side of flange 5a. Fitting 16 also includes a bracket 20 having a threaded opening which carries a clamp screw 21, the inner end of which is arranged to bear against an outer surface of angle 5. As seen in Figure 2, the opposite end of the blade of T square 8 is provided with a head 22 which slidably engages the outer face of the angle 4. It will be understood that T square 9 may conveniently be equipped with guiding and locking devices the same as or similar to those hereinabove described in connection with T square 8.

In operation, the blade of T square 8 is assembled with head 22 and fitting 16 at its opposite ends as described. With the clamp screw 21 in slacked off position, as shown in Figure 2, T square 8 may be moved to any position of vertical adjustment in relation to base 1 where it can be secured by turning clamp screw 21 until its inner end snugly engages the outer surface of angle 5.

Each of the blades of T squares 8 and 9 is conveniently equipped to receive interchangeable scales, as 23, in longitudinally extending slot openings 23ᵃ from one lateral edge thereof. Where the slot 23ᵃ extends from end to end of the blade, a pin, as 24, or other suitable stop member, is interposed therein and thus provides a fixed zero position determining element for a scale operatively lodged in the slot. It is contemplated that at least the upper wall of the slot may be made of transparent material such as a clear plastic or glass. For convenience in dislodging the scales from their slots, an opening 8ᵃ and 9ᵃ is provided through a portion of the upper wall of the slots and extending inwardly through the narrow bottom wall thereof. Thus, when it is desired to dislodge the scales 23, a pencil point or other narrow ended implement is inserted through opening 8ᵃ to a position back of the inner edge of the scale 23 which may then be pushed forward and outwardly through the edge opening of the slot.

One or both of the T squares may also conveniently be provided with longitudinally extending undercut grooves 25 adapted to receive interchangeable and slidable scales corresponding to the scale 11 and the slide 12. The arrangements just described are best shown in Figure 4 with the fixed scale indicated at 23 and an endwise slidable scale at 26.

The various removable and interchangeable linear scales hereinabove referred to in connection with the flanges 4a and 6a and in connection with the T squares 8 and 9 are designed to divide the given length into arithmetic, logarithmic or other subdivisions of various sizes; and for convenience of use these will be furnished in sets having divisions on the several scales of progressively different sizes. Such sets are furnished, according to this invention in a quiver or casing 27, Figure 12, or in a plurality of such quivers, each of which may be of a size to accommodate scales of corresponding overall dimensions. As shown in Figure 12, the quiver 27 is provided with an accordion pleated sheet 28 slidable into and out of a scabbard or casing, thus providing multiple scale receiving pockets each formed by a fold of the sheet 28 and by the scabbard. In each pocket one of the scales, as 29, is accommodated. The usefulness of the scale box is enhanced by providing markings 30 on the walls of the several compartments formed by the folds of the pockets 28, which markings correspond to like markings 31 on the several scales. In a similar manner, the pocket walls and the scales may also be provided with markings which indicate the special characteristics of each scale. Advantages of this arrangement are that the scales are protected when not in use and any desired scale will be readily available for use when needed.

As seen in Figure 7, provision is also made for employing angular scales of different characteristics independently or in combination with linear scales, if desired. For such purpose, a convenient arrangement includes a scale carrier conveniently in the form of a block 32 having rectangular edges, as 33 and 34, the edge 33 being disposed to slide along an edge of T square 8 and edge 34 being engaged by an edge portion of T square 9, as shown.

As shown more clearly in Figure 9, block 32 is provided with a central boss or rivet 35. An annular scale 38 (which may be one of a set of interchangeable scales having different markings) has a central opening which fits tightly onto a peripheral boss 36 of a transparent disc 37. A V-shaped projection 39 on the scale fits into a corresponding recess in disc 37 in order to assure accurate positioning of the scale 38 while releasably holding it in operative position in relation to the disc 37 and the block 32 cemented thereto. A radial ruler 40 is pivoted on the rivet or boss 35, and this may be slotted for a scale 23 like those used in the T squares. A second annular scale 41 is interchangeably mounted on carrier disc 42, which may be rotatably mounted on the same rivet or boss 35. The arrangement is such that ruler 40 and scale 41 are freely rotatable around boss 35 in either direction and scale 38 is fixed in relation to block 32. The sequence arrangement of the parts 32—37—42—40 is not essential and can be varied within the scope of the broad invention.

In Figure 10 is shown a modified annular scale in which the interchangeable scales are made semi-annular. The carrier disc 37a in this case is slotted from its peripheral edge as indicated at 36a and at opposite ends of the same diameter the slot deepens in a V-shaped well 45. Each semi-annular scale is of uniform radial width equal to that of the slot except at one end where it widens by a V-shaped projection 39a narrower than the well 45 so that the scale after inserting into the well and slot can be swung down to bring its opposite end into the slot 36a. Holes 46 are provided like the holes 8a and 9a previously described, so that a pencil point or other pointed instrument can be inserted to push the scale out of the slot. When this is done, the scale swings about the point of its V-shaped projection 39a throwing out its opposite end, and at the same time prying out the adjacent end of the other semi-annular scale.

This scale as shown in Figure 10, can be used in lieu of that shown in Figures 7–9 for either the scale and carrier 37—38 or 41—42. The second rotatable scale 41—42 may be omitted, just as the movable scales 14 and 26 may be omitted in the embodiment of Figures 1–5.

In Figure 11 is shown another type of angular scale embodying the invention. In this case a square scale carrier 37b is provided advantageously laminated from an upper and lower layer (at least one of which is transparent) of sheet material and an intermediate spacer layer of smaller dimensions so as to leave a slot opening from each edge. Into these slots 36b are fitted four angular scales each on a straight strip of paper with its ends cut off at 45° angles so that they fit together as shown. Holes 46 are provided as before to assist in removal of the scales. This form has the advantage that the straight scales are easier to handle and to store without injury.

Although the scales can be made of any desired material and marked in any desired manner, it is an important advantage of my invention that the interchangeable scales may be printed on paper and die cut with very little expense.

Let us assume for purposes of illustration that one has certain data which is to be plotted in the form of a continuous graph as shown in Figure 1. One first selects the size sheet on which the graph is to be made. Next the maximum ordinate value to be plotted is determined from the data and a scale selected from the quiver 27 which will represent that value in the full width of the area chosen. This scale is then inserted into the slot in the edge of the T square 9. An identical scale may also be inserted in the groove between 4a and 10 if it is desired to plot or note cumulative values.

Again the data is referred to to determine the maximum abscissa value; and a scale having that value for the full width of the area is selected from the quiver and inserted in the slot at 23ª in the T square 8. If cumulative values are to be noted or plotted in this direction an identical scale can be put into the slide as shown at 26.

The paper 2 is mounted on the board 1 and the T squares 8 and 9 mounted as already described, and one is ready to start the plotting.

Assume first that the data is to be plotted simply to show a value at given successive times, for example, the price of wheat on the first of each month: T square 9 is placed on the middle of the first space on the scale of T square 8, and the price for the first month measured on the scale of the square 9 and marked on the paper. This is repeated for each month and the plot points connected to give the graph shown.

If it were desired to plot the progressive depletion of a mineral deposit, then the first plot point would be located as before; but, when the point is located, the T square 8 would be moved to that level and the sliding scale 14 then moved to bring its zero point at the edge of T square 8 in line with the first plotted point. The second year's removal of ore is then measured on scale 14 and T square 8 moved up to that level and the second point plotted opposite the second graduation on the scale of T square 8. Scale 14 is again moved to bring its zero to the T square edge and the process repeated for each point. The actual value at each point can always be read from the scale 23 on T square 9 and this may be noted on the chart if desired.

If a bar chart is being made instead of a graph, then the lines for the sides of the bars will be drawn on the edge of the T square 9 while it is positioned on the proper mark of the scale on T square 8.

For "pie charts" the angular scale is centered on the center of the chart area and held there by engaging block 32 (Figure 7) against the two T squares on its lower and side edges respectively. The radial ruler 40 is swung to the zero position marked by a radial line. The percentile value of the first division is then measured off on the fixed annular scale, the ruler swung to that position and the second radial boundary marked on the chart. The rotatable scale 41—42 is then rotated to bring the zero position to this marking and the percentile value of the next division is marked off on this scale, the radial ruler 40 swung to the indicated position and the boundary marked. This is repeated for each division.

If polar coordinate graphs are to be drawn, then an annular chart 38 is selected for the maximum values of one set of data, just as a linear chart was selected in the first example given, and a linear chart 23 is selected for the related values and inserted into the slot in the radial ruler 40. An annular chart 41 with the same divisions may be inserted into the carrier 42 and used to cumulate values in the same way as with rectangular coordinates of the second example described.

As various embodiments may be made of the above invention and as changes might be made in the embodiments above set forth, it is to be understood that all matter hereinbefore set forth or shown in the accompanying drawings is to be interpreted as illustrative and not in a limiting sense.

I claim:

In plotting apparatus of the type described, the combination of, a base having a flat top surface and a T square mounted thereon, a slidable scale mounted perpendicularly to said T square, a stop on said scale spaced from the zero point a distance equal to the width of said T square and adapted to contact the edge of said T square opposite the edge with which said zero point is to be aligned for easily and positively moving said slidable scale into zero alignment with the edge of said T square.

References Cited in the file of this patent

UNITED STATES PATENTS

| Number | Name | Date |
| --- | --- | --- |
| 362,106 | Pember et al. | May 3, 1887 |
| 368,797 | Ward | Aug. 23, 1887 |
| 557,599 | Pape | Apr. 7, 1896 |
| 557,804 | Hammers et al. | Apr. 7, 1896 |
| 586,975 | O'Neal | July 27, 1897 |
| 634,836 | Rich | Oct. 10, 1899 |
| 774,365 | Phenix | Nov. 8, 1904 |
| 842,047 | Williams | Jan. 22, 1907 |
| 1,156,512 | Allyn | Oct. 12, 1915 |
| 1,586,067 | Christian | May 25, 1926 |
| 1,849,771 | Smith et al. | Mar. 15, 1932 |
| 1,901,755 | Le Seur | Mar. 14, 1933 |
| 1,965,017 | Wellington | July 3, 1934 |
| 2,048,221 | Redding | July 21, 1936 |
| 2,093,783 | Shulkin | Sept. 21, 1937 |
| 2,101,365 | Erickson | Dec. 7, 1937 |
| 2,190,947 | Kinzler | Feb. 20, 1940 |
| 2,300,401 | Basler et al. | Nov. 3, 1942 |
| 2,315,893 | Chapin | Apr. 6, 1943 |
| 2,368,958 | Williams | Feb. 6, 1945 |

FOREIGN PATENTS

| Number | Country | Date |
| --- | --- | --- |
| 5,031 | Great Britain | Mar. 2, 1909 |
| 129,611 | Switzerland | Jan. 28, 1923 |
| 400,997 | Germany | June 29, 1923 |
| 504,651 | Great Britain | Apr. 28, 1939 |